United States Patent
Chen

(10) Patent No.: US 11,023,529 B2
(45) Date of Patent: Jun. 1, 2021

(54) SYSTEM AND METHOD FOR GENERATING CONTAINER IMAGE SUGGESTIONS

(71) Applicant: Red Hat, Inc., Raleigh, NC (US)

(72) Inventor: Huamin Chen, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 233 days.

(21) Appl. No.: 15/861,885

(22) Filed: Jan. 4, 2018

(65) Prior Publication Data

US 2019/0205408 A1    Jul. 4, 2019

(51) Int. Cl.
*G06F 16/9032* (2019.01)
*H04L 29/08* (2006.01)
(Continued)

(52) U.S. Cl.
CPC ...... *G06F 16/90324* (2019.01); *G06F 9/5077* (2013.01); *G06F 11/0709* (2013.01);
(Continued)

(58) Field of Classification Search
CPC ...... G06F 16/23; G06F 16/235; G06F 16/288; G06F 16/55; G06F 16/583;
(Continued)

(56) References Cited

U.S. PATENT DOCUMENTS

| 9,256,467 | B1 | 2/2016 | Singh et al. | |
| 2016/0140146 | A1* | 5/2016 | Wexler | G06K 9/4604 707/741 |

(Continued)

FOREIGN PATENT DOCUMENTS

| WO | WO2015126292 A1 | 8/2015 |
| WO | WO2016099346 A1 | 6/2016 |

OTHER PUBLICATIONS

Google, Inc., "Containers at Google—A Better Way to Develop and Deploy Applications" https://cloud.google.com/containers/.
(Continued)

*Primary Examiner* — Truong V Vo
(74) *Attorney, Agent, or Firm* — Haynes and Boone, LLP

(57) ABSTRACT

Methods, systems, and computer program products are included for suggesting at least one container image from one or more searched container images, and including the suggested container image in a search result. A log-in request to log a user into a cloud user account of a cloud platform is received via a user interface, and responsive to the log-in request, the user is logged into the cloud user account. A search query for a type of container image is received from the user via the user interface. The cloud platform is searched for one or more container images within the queried type of container image. One or more container images from among the one or more searched container images are suggested, where the suggesting is based on one or more suggestion parameters including: an indication of an error rate of the one or more searched container images, an amount of cloud computational resources that would be consumed by running the one or more searched container images, and a compatibility between the one or more searched container images and one or more software development environments (SDE) of the user, wherein the SDE compatibility is known from the cloud user account. A search result is provided, the search result including the one or more suggested container images. The search result is based at least on: the search query, an amount of cloud computational resources available to the user through the cloud user account, and the SDE compatibility, wherein the amount of available cloud computational resources is known from the cloud user account.

20 Claims, 5 Drawing Sheets

(51) Int. Cl.
  *G06F 11/34*   (2006.01)
  *G06F 9/50*    (2006.01)
  *G06F 11/07*   (2006.01)

(52) U.S. Cl.
  CPC ...... *G06F 11/0766* (2013.01); *G06F 11/3476* (2013.01); *H04L 67/306* (2013.01); *H04L 67/10* (2013.01)

(58) Field of Classification Search
  CPC ........... G06F 16/5846; G06F 16/90324; G06F 9/5077; G06F 11/0709; G06F 11/0766; G06F 11/3476; H04L 67/306
  See application file for complete search history.

(56) References Cited

U.S. PATENT DOCUMENTS

2017/0116412 A1*  4/2017  Stopel ................... G06F 21/577
2017/0177860 A1   6/2017  Suarez et al.
2017/0212830 A1   7/2017  Thomas et al.
2017/0300697 A1  10/2017  Iyer et al.
2018/0336345 A1* 11/2018  Georgiev ................ G06F 21/53

OTHER PUBLICATIONS

Tost et al., "Build and extend Docker container middleware functions", Adding applications to leverage Docker image layering, Aug. 22, 2016, 11 pages, IBM Corporation, https://www.ibm.com/developerworks/library/mw-1608-tost-trs/index.html.

* cited by examiner

| | | Amount of Available Cloud Computational Resources 418 | | | | | |
|---|---|---|---|---|---|---|---|
| Resource Identifier 422 | Description 424 | Available Virtual CPUs 426 | Available Memory 428 | Available Storage 430 | When Next Available 432 | Scheduled Jobs 434 | Last Aggregated Log 436 |
| Starter Plan VM1 | N. Virginia Cluster | 1 | 557 MiB | 728 MiB | 3 hours | N/A | 11/28-11/29 |
| Starter Plan VM2 | California Cluster | 1 | 223 MiB | 615 MiB | 18 hours | N/A | 11/28-11/29 |
| Pro Plan VM1 | Virginia Cluster | 93 | 1828 MiB | 83 GiB | Now | 08:05:19 | 11/23-11/29 |
| Pro Plan VM4 | Ireland Cluster | 46 | 864 MiB | 42 GiB | Now | 09:10:24 | 11/23-11/29 |

*FIG. 4*

SYSTEM AND METHOD FOR GENERATING CONTAINER IMAGE SUGGESTIONS

FIELD OF DISCLOSURE

The present disclosure generally relates to data processing, database and file management or data structures, and more particularly to data query and retrieval.

BACKGROUND

Containers are lightweight mechanisms for isolating running processes so that they are limited to interacting only with their designated resources. Many application instances can be running in containers on a single host without visibility into one anothers' processes, files, network, and so on. Typically, each container provides a single service (often called a "micro-service"), such as a web server or a database, though containers can be used for arbitrary workloads.

An image is a binary that includes all of the requirements for running a container, as well as metadata describing its needs and capabilities. Containers only have access to resources defined in the image unless the container is given additional access when it is created. By deploying the same image in multiple containers across multiple hosts and load balancing between them, a provider of cloud container services can provide redundancy and horizontal scaling for a service packaged into an image.

Cloud container service providers also supply builder images that assist with creating new images by adding a user's code or configuration to existing images. Because applications develop over time, a single image name may refer to many different versions of the "same" image. Each different image may be referred to uniquely by its hash (a long hexadecimal number e.g., (fd44297e2ddb050ec4f . . . ) which is usually shortened to 12 characters (e.g., fd44297e2ddb). Images may also be given names and tagged with version identifiers.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. In one general aspect, a system includes a non-transitory memory, and one or more hardware processors coupled to the non-transitory memory to execute instructions from the non-transitory memory to perform operations including: receiving, from a user interface, a log-in request to log a user into a cloud user account of a cloud platform and logging the user into the cloud user account; receiving, from the user interface, a search query for a type of container image; searching, on the cloud platform, for one or more container images within the queried type of container image; suggesting one or more container images from among the one or more searched container images, where the suggesting is based on one or more suggestion parameters including: an error rate of the one or more searched container images, an amount of cloud computational resources that would be consumed by the one or more searched container images, and a compatibility of the one or more searched container images to a software development environment of the user, where the compatibility is known from the cloud user account; and providing a search result of the one or more searched container images, the search result including the one or more suggested container images, and the search result based at least on: the search query, an amount of cloud computational resources available to the user through the cloud user account, and the compatibility to a software development environment of the user, where the amount of available cloud computational resources is known from the cloud user account. Other examples of this aspect include corresponding computer systems, apparatus, and computer programs recorded on one or more computer storage devices, each configured to perform the actions of the methods.

In one general aspect, a computer-implemented method includes: receiving, from a user interface, a log-in request to log a user into a cloud user account of a cloud platform and logging the user into the cloud user account; receiving, from the user interface, a search query for a type of container image; searching, on the cloud platform, for one or more container images within the queried type of container image; suggesting one or more container images from among the one or more searched container images, where the suggesting is based on one or more suggestion parameters including: an error rate of the one or more searched container images, an amount of cloud computational resources that would be consumed by the one or more searched container images, and a compatibility of the one or more searched container images to a software development environment of the user, where the compatibility is known from the cloud user account; and providing a search result of the one or more searched container images, the search result including the one or more suggested container images, and the search result based at least on: the search query, an amount of cloud computational resources available to the user through the cloud user account, and the compatibility to a software development environment of the user, where the amount of available cloud computational resources is known from the cloud user account. Other examples of this aspect include corresponding computer systems, apparatus, and computer programs recorded on one or more computer storage devices, each configured to perform the actions of the methods.

One general aspect includes a non-transitory machine-readable medium having stored thereon machine-readable instructions executable to cause at least one machine to perform operations including: receiving, from a user interface, a log-in request to log a user into a cloud user account of a cloud platform and logging the user into the cloud user account; receiving, from the user interface, a search query for a type of container image; searching, on the cloud platform, for one or more container images within the queried type of container image; suggesting one or more container images from among the one or more searched container images, where the suggesting is based on one or more suggestion parameters including: an error rate of the one or more searched container images, an amount of cloud computational resources that would be consumed by the one or more searched container images, and a compatibility of the one or more searched container images to a software development environment of the user, where the compatibility is known from the cloud user account; and providing a search result of the one or more searched container images, the search result including the one or more suggested container images, and the search result based at least on: the search query, an amount of cloud computational resources available to the user through the cloud user account, and the compatibility to a software development environment of the user, where the amount of available cloud computational resources is known from the cloud user account. Other examples of this aspect include corresponding computer systems, apparatus, and computer programs recorded on one or more computer storage devices, each configured to perform the actions of the methods.

BRIEF DESCRIPTION OF THE DRAWINGS

FIG. 4 is an organizational diagram illustrating an amount of available cloud computational resources, in accordance with various examples of the present disclosure.

Figure 1:
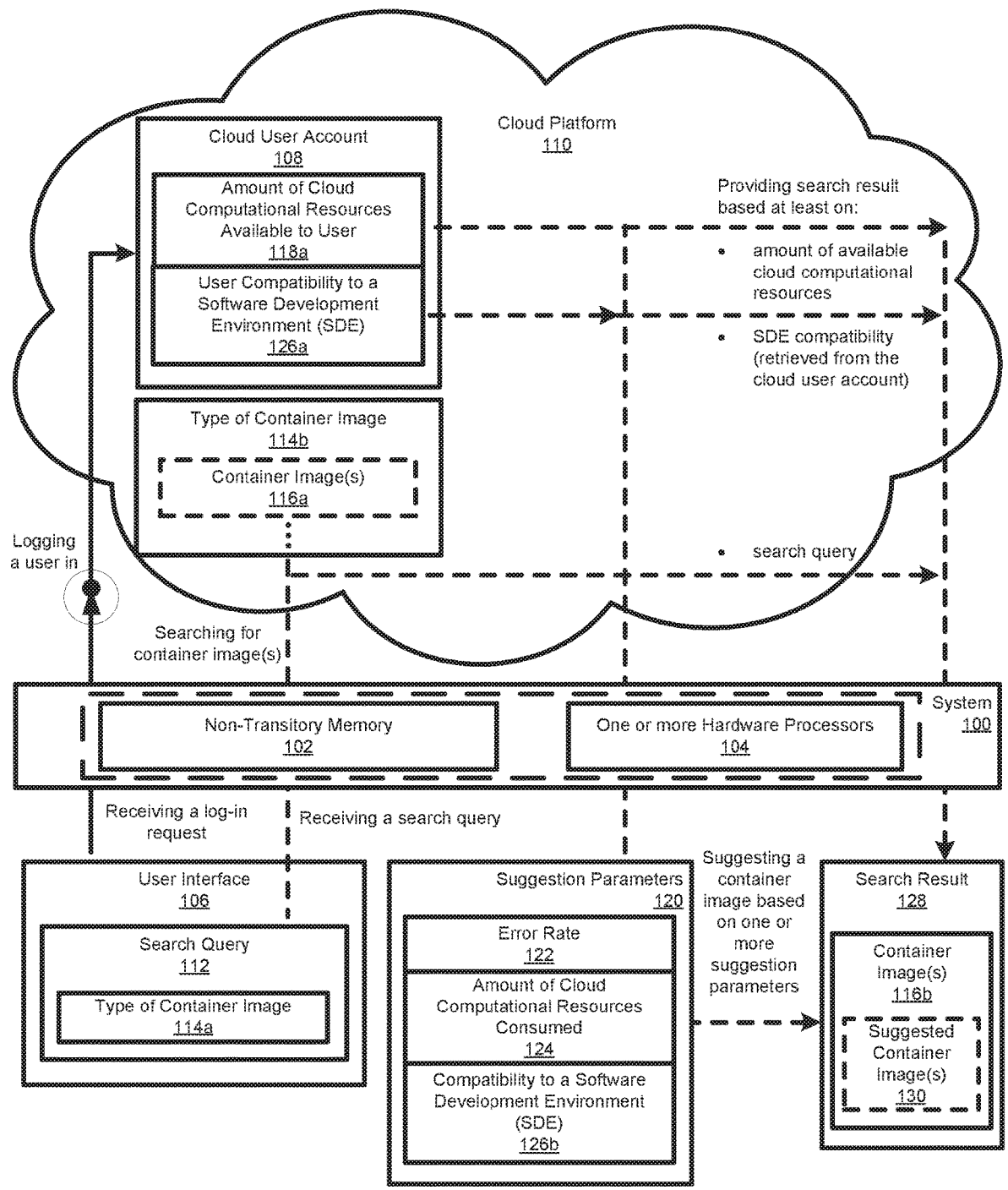
FIG. 1 is an organizational diagram illustrating a system including a non-transitory memory and one or more hardware processors for suggesting at least one container image from one or more container images, and including the suggested container image in a search result, in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Some years ago, a jam study was conducted by a business professor at a renowned New York university. The study found that when consumers were faced with too many choices—in this case twenty-four flavors of jam—almost all of the consumers would rather not buy any jam at all than buy the "wrong" flavor. In fact, only three percent of the consumers confronted with the choice of twenty-four jams ended up buying jam. By contrast, ten times as many consumers—or thirty percent—bought jam when presented with only six choices.

The jam study essentially states the paradox of choice. When given too many choices, consumers (or users) can become paralyzed and fail to act, or otherwise act inefficiently. Yet, when given too little choice, consumers may also fail to act for fear that a better, unrepresented choice exists out there. Thus, consumers and users waste valuable time and resources chasing down alternatives.

In the context of searching for container images, it would not be unsurprising to find (like in the jam study) that users bombarded by dozens of image search results would behave no differently than jam consumers—the new users would rather not choose any image than choose a wrong one lest it jeopardize their build. Even with user-friendly image names, many users especially new ones—feel overwhelmed by the sheer number of images, versions, and undecipherable hashes that pop up when they search for something as seemingly innocuous as "LINUX." Without much more than a name and version number to decide on an image, a new user would be hard pressed to know which image, out of all the dozens of images returned in the search, is the right image for the user's intended application.

Meanwhile, new users initially attracted to a platform for its ease of use and intuitiveness come away feeling frustrated with the perceived difficulty of building their projects on the platform. To improve the user experience, what is needed is an optimized search result that strikes the right balance between presenting too many and too few choices, and a search process which efficiently helps users to feel confident that they are making the right choice.

Various examples described herein provide techniques for helping users overcome the paradox of choice when searching for container images on a cloud platform. As a high-level overview, the techniques include suggesting one or more container images to the user based on information from the user's account and other sources, and optimizing a search engine to present less—rather than more—search results.

In more detail regarding the optimization of the search engine, conventionally, when a user searches for a container image on a cloud platform, a user is presented with a large number of irrelevant search results. For example, the user may be presented with images requiring root access even though the user does not have sufficient user privileges. The user may also be presented with images with extended capabilities, even though the user may not have paid for the dependencies needed to run the image. Thus, conventional searches do not take into account a user account's capabilities and limitations, and one way to reduce the number of search results while making them more relevant is to program the search engine to take such factors into account.

For example, information from the user's account, such as an amount of cloud computational resources available to the user, the user's privilege levels, and the user's software development environment (e.g., operating systems, programming languages, container applications, existing images, etc.) may all be used to optimize the search results and make them more relevant to the user. For ease of use and to maintain a clean user interface, the search optimization may be made transparent to the user by appending the optimization information to the user's search query on the back end, such that the user need do nothing more than log-in to the cloud platform and enter the search query to obtain the optimized search results.

In more detail regarding the suggestion of images, conventionally, users are presented with a list of search results after entering a search query into a search engine. Thus, users have traditionally relied on their own judgment to select an image out of the panoply of images in the search result. For new users who lack the knowledge to sift through dozens of images, picking out one image from among many can be an overwhelming task. One way to improve the new user experience is to deliver image suggestions to the user. Because the user's account information and other information, such as operational error rates of the image, are consulted before the image is suggested, a high likelihood exists that the suggested image will meet the user's needs, and the user may confidently rely on the suggestion to build his or her project.

Further, the suggestion may take into consideration a trajectory of the user's current project and predicting the next image required for the project by comparing the contents and build sequence of the user's project with that of other users' more mature and (ideally) successful projects on the cloud platform. Then, when the user searches for the next image component of his or her build, an informed suggestion may be made to help the user reliably reach the next stage of his or her build. In addition, the suggestion may be personalized to the user. For example, the suggestion may take into account parameters such as the cloud computational resource constraints of the user's account, the user's privilege levels, the user's software development environment, the resource cost of the suggested image, an error rate of the suggested image, a composite score of all the parameters, etc. In determining the suggested image, different relative weights may be assigned to each parameter.

To build the user's trust in the suggestion process, and to allow for user verification of the suggested image, a search result may be provided to the user to show the user the parameters which had been considered in the selection. The search result may be provided in a user-friendly format (e.g. a summary table) and include the parameters considered in the suggestion. The results may also include indications of potential issues. The indications may be in the form of text commentary, icons, graphics, flags, emojis, etc.

The techniques herein provide useful advantages and improvements to the functioning of a computer system. For example, with the suggestion feature, users will find image searching more convenient and less stressful. Users will no longer be faced with the paradox of choice, and the search paradigm will shift as users transition away from being primary decision makers to being verifiers of decisions made by computers. As a result, user satisfaction is likely to improve, and in return, (new) user retention as well. Aside from improvements to the optimized way computers perform searches, the overall cloud platform ecosystem will also be improved, given the techniques' keen emphasis on trustworthy, quantifiable metrics. In particular, cloud resource utilization is likely to become more efficient and error rates will decrease, leading to improvements in overall container image quality.

FIG. 1 is an organizational diagram illustrating a system 100 for suggesting one or more container images 130 from among one or more searched container images 116*a*, and providing the suggested container image 130 in a search result 128.

The system 100 includes a non-transitory memory 102, and one or more hardware processors 104 coupled to the non-transitory memory 102. In the present example, the one or more hardware processors 104 executes instructions from the non-transitory memory 102 to suggest one or more container images 130 from among one or more searched container images 116*a*, and provide the suggested container image 130 in a search result 128

Each of the one or more hardware processors 104 is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

A non-transitory memory 102 is structured to include at least one non-transitory machine-readable medium on which is stored one or more sets of instructions (e.g., software) including any one or more of the methodologies or functions described herein. The non-transitory memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read). Accordingly, any of the operations, steps, and actions of the methods described herein may be implemented using corresponding machine-readable instructions stored on or in a memory that are executable by a processor.

Because the system 100 includes a bus or other communication mechanism for communicating information data, signals, and information between the various components of system 100 and between the user interface 106 and the cloud platform 110, the system 100 may be located anywhere, e.g., on a user's computer system (which includes laptops, desktops, server, mainframe, tablets, smart phones, smart watches, etc.), on a cloud platform 110, or at an intermediary between the user's computer system and the cloud platform 110 (e.g., on a server). Components may include an I/O component, such as a keyboard, mouse, touch interface, and/or camera that process(es) user actions such as key presses, clicks, taps, and/or gestures and sends a corresponding signal to the bus or other communication mechanism. The I/O component may also include an output component such as a display.

In some examples, the user may use the I/O component to command the system 100, via a user interface 106, to log the user into a cloud user account 108 on the cloud platform 110. The system 100 receives the log-in request via the bus or other communication mechanism, and logs the user into the cloud user account 108 on the cloud platform 110. User interface 106 includes command line interfaces, graphical user interfaces, and other types of interfaces for communicating with a computer system.

The user may request the system 100, via a search query 112 made on the user interface 106, to search for a type of container image 114*a* on the cloud platform 110. The user interface 106 may include its own I/O components, which a user may use to enter a search query 112 for a type of container image 114a. In some examples, the user interface 106 may be communicatively coupled to the system 100 via a network interface. A user may, for example, enter the search query 112 using a keyboard at the user interface 106, which search query 112 the system 100 receives via a network interface. The system 100 may also be communicatively coupled to the cloud platform 110 via a second network interface. Thus, the system 100 may search the cloud platform 110 using the search query 112 via the second network interface. In some examples, the first and second network interfaces are the same. In other examples, the first and second network interfaces are different.

Generally, a transceiver or network interface transmits and receives signals between electronic devices via a communications link to a network. The network may be a local area network (LAN), wireless LAN (WLAN), public switched telephony network (PTSN), and/or various other wired or wireless networks, including telecommunications, mobile, and cellular phone networks, the internet, a cloud, a peer-to-peer sharing network, and/or any combination of networks thereof that is capable of interconnecting computing devices and/or computer programs. In some examples, the transmission is wireless, although other transmission media and methods may also be suitable.

The cloud user account 108 may be of any type, including a free account, a subscriber account, a pay-as-you-go account, an individual account, a business account, etc. Different types of cloud user accounts 108 may have different cloud computational resource limits. For example, a free account may have a limit of 1 vCPU and 1 gigabyte (GiB) of memory. Once this limit is reached, no further applications may be run or instantiated on the cloud platform 110. The cloud user account 108 may include information such as the user's personal information, the user's account type, an amount of cloud computational resources purchased by the user, an amount of cloud computational resources available to the user 118a, the user's compatibility to one or more software development environments (SDE compatibility) 126a, the user's privilege level, search preferences, etc.

The type of cloud user account 108 may determine the amount of cloud computational resources available to the user 118a. As illustrated in FIG. 4, the cloud user account 108 may indicate the amount of cloud computational resources available to the user 118a by showing an identifier of a virtual machine, a description of the virtual machine, a description of the virtual machine's location, a description of the server cluster, available vCPUs, available memory, available persistent storage, when the resources would be next available to the user (e.g., for free accounts, resources may have to go to sleep for a specified number of hours per twenty-four hour period), when jobs are next schedule, log dates, etc.

The user's SDE refers broadly to a software environment that facilitates application development, and encompasses programming environments, software development environments, deployment environments, testing environments, integrated development environment (IDE), etc. In an SDE, a software developer may program, build, test, deploy, and maintain software, including containerized applications. A cloud platform may support multiple SDE's, although not all users may be able to develop in those SDE's for one reason or another. For example, a user may not be familiar with developing applications using the RED HAT MINISHIFT SDE, but may be familiar with RED HAT OC CLUSTER UP SDE. In another example, a user may not be familiar with programming in RUBY, but may be familiar with PYTHON. In further examples, conflicts may exist between the different images, operating systems, application platforms, etc., to cause one SDE to be incompatible with another. The system 100 may identify such SDE incompatibility, for example when a user searches for multiple, incompatible images for his or her application, and suggest compatible images instead.

In some examples, the user may indicate his or her compatibility to an SDE (user SDE compatibility) 126a when setting up his or her cloud user account 108. In other examples, the user SDE compatibility 126a may be dynamically updated as the user demonstrates compatibility. For example, if the system 100 receives a request to push to the cloud platform 110 a project developed in an SDE which the user had not previously marked as compatible, the system 100 may request that user SDE compatibility 126a be updated in the cloud user account 108. The user SDE compatibility 126a may also be used to optimize the search result 128 or to suggest one or more container images 130.

The cloud platform 110 is a network computing platform, and may include operating systems, execution environments, databases, and web servers. The cloud platform 110 is backed by physical computing resources, such as hardware processors and memory, which may be pooled via local area networks (e.g., server farms), and made available to users as cloud computational resources via wide area networks or the internet.

The physical resources may be virtualized in virtual machines, which are emulations of computer systems and provide some or all of the functionality of a physical computer, so that a large number of users may share the physical resources of the cloud platform 110. The virtual machines may be system virtual machines or process virtual machines. System virtual machines provide full virtualization, i.e., they have the ability to execute full operating systems and share and manage physical computing resources such that multiple, isolated operating environments may coexist on the same physical machine. Process virtual machines execute computer programs in a platform-independent environment. A process virtual machine runs as a normal application within a host operating system and supports a single process. Process virtual machines provide platform-independent programming environments that abstract away details of the underlying hardware or operating system, allowing a program to execute the same way on any platform.

Instead of hardware virtualization, containers may be deployed based on operating system-level virtualization. These containers are isolated from each other and from the host. For example, they may have their own filesystems, they may not be able to see each others' processes, and their computational resource usage can be limited. Containers offer numerous advantages over traditional virtual machines. They are small, fast, portable, and work across multiple operating systems based upon the same kernel. Containers may be easier to build than virtual machines, may be more easily portable across different networks and clouds, and are consistent across variety of operating systems because the containers include their own dependencies and are therefore not dependent on the underlying operating system infrastructure or on the host filesystem.

Containers may also be used to streamline the application build process. With containers, a single application can be packed into a single container image, creating a one-to-one application-to-image relationship. With such a one-to-one relationship, managing the containers is equivalent to managing deployment of the application. Thus, the container images may be created at the build or release stage rather than at the deployment stage, further, each application, because containerized, may be built independently of other applications in the application stack or in the production development environment. In addition, containers may be managed more transparently than virtual machines, since the containers' process lifecycles are managed by infrastructure rather than by a process supervisor hiding inside the container.

An example of a cloud platform 110 is a hybrid-cloud service which integrates the architecture, processes, platforms and services needed to run applications in containers. The cloud platform 110 may run both traditional non-cloud applications as well as cloud-native applications. Using the cloud platform 110, application developers may develop and run their software solutions using cloud computational resources (e.g. virtual computer processing units (vCPUs) and memory) provided by the provider of the cloud platform 110. In some examples, the cloud platform 110 may dynamically allocate and scale the cloud computational resources to meet the needs of the applications running on the cloud platform 110. In some examples, the cloud platform 110's scaling is limited by the type of cloud user account 108. For example, resource scaling may not be permitted for a personal account, but resource scaling may be permitted up to a pre-defined limit for a business account.

Using the user interface 106, a user may enter a search query 112. The search query 112 may be for a type of container image 114a. The search query may be a keyword search, a natural language search, a Boolean search, a hash search, an identifier search, or any other type of search. For example, a user may enter the search query "database" to search for a relational database management system. A user may also search generally for any other type of container image, e.g., for "web servers," or even specifically for a particular type of web server. The system 100 receives the search query 112 via the bus or other communication mechanism, and searches for the queried type of container image on the cloud platform 110 via a network interface.

The type of container image 114a may be a branch, class, category, family, genre, group, sort, species, strain, type, variety, or indeed any grouping of container images possessing something in common. For example, when a user searches for "database" in general, the type of container image may be more broadly defined as all database management container images, or more narrowly as all database container images based on a particular database. As another example, when a user searches for something specific, such as a brand name web server, the type of container image may be more broadly defined as all web servers based on the same architecture as the brand name web server, or more narrowly as all versions of the brand name web server, e.g., version 3.0 and version 3.1. In either case, the system 100 searches for one or more container images 116a within the queried type of container image 114b.

Based on suggestion parameters 120, the system 100 suggests one or more container images 130 from among the searched container images 116a. For example, if a user searches for a particular brand name of web server, and the search result indicates that two images of the brand name web server exist (e.g., Image 1 which is of version 3.0, and Image 2 which is of version 3.1), the system 100 may suggest the older, more stable version for new users or for users whose priority is operational stability, but the newer version with the latest features for advanced users. As a further example, if a user searches for a brand name database and the search result indicates a large number of images built on the brand name database, the system 100 may suggest a basic built image with the lowest operational error rate and resource consumption to users with a free account type. By contrast, for enterprise users, the system 100 may suggest the most easily scalable brand name database image. The system 100 may also suggest an image which has enterprise-level support and capabilities, or an image that is compatible with the enterprise's other existing images and projects, or other relevant suggestions informed by the information the system 100 has about the user and the user's projects.

The suggestion parameters 120 may include an error rate 122 of the image, an amount of computational resources that would be consumed 124 by running the image, the user SDE compatibility 126a (or 126b when retrieved from the cloud user account 108), the account type of the user, a composite score of one or more of the suggestion parameters, a privilege level of the user to run the image (e.g., root- or user-level), the popularity of the image (e.g., indicated by the number of times the image has been pulled), the features of the image (e.g., basic- or pro-level features), recommendations by other users, recommendations by the provider of the cloud platform, user reviews posted on external websites, community user ratings, etc.

The error rate 122 may be a reliable error rate determined from operation logs of the suggested image (e.g., an automatically generated image crash report). The source of the operation logs may also be reliable, for example if they are provided by trustworthy third parties such as the image developer, or if the logs are maintained by the cloud platform provider itself. The operation logs may be computer-generated and may be updated periodically (e.g. daily), thus the error rate may be a "live" error rate. The operation logs may be non-user modifiable after they have been generated, and a user may not be able to opt out of sending the error report after it has been generated. Thus, the error rate may be both reliable and accurate. Where multiple operation logs exist, for example where operation logs are maintained on a per-virtual machine rather than on a per-image instance basis, the overall error rate for the image (run on multiple virtual machines) may be aggregated from multiple operation logs and reported in a single master log. The master log may also be updated at the same frequency as the operation logs.

The system 100 may dynamically change its suggestion parameters 120 as the system 100 learns from the user based on the user's interactions with the cloud platform. For example, if a user changes his account type from a free account to an enterprise account, the system 100 may change the suggestion parameters 120 to include enterprise-level support, enterprise-level availability, enterprise-level scalability and other such factors which may be relevant and important to enterprises. As another example, the suggestion parameters 120 may focus initially on images that are easy to use and reliable for new users, but as the user builds more projects on the cloud platform 110 and becomes more familiar with the type of image he or she has been working with, the system 100 may suggest a more advanced image with more features for the user's next project requiring the same type of image. As a further example, the suggestion parameters 120 may be changed based on the trajectory of the images queried and the current state of a user's project on the cloud platform 110. For example, the system 100 may be able to gather that a user who has a search trajectory of "web server," "single sign-on," "encryption," "web mail," and so forth, is probably trying to build a secure webmail application. While initially the suggestion parameters 120 may be catered to selecting the best of each type of image in a multi-image build, once the system 100 surmises (e.g., based on the search trajectory or the images actually pulled from the cloud platform) that the user is building up a particular type of application by piecing together various parts, the system 100 may suggest an image package using suggestion parameters that place more weight on the overall compatibility of the several parts and the core features of the intended application (e.g., security) rather than the properties of the individual image (e.g., ease of use).

The system 100 may also adjust suggestion parameters 120 based on what the system 100 has learned from other users, and dynamically change its image suggestions based on those experiences. Returning to the secure webmail application example above, the system 100 may determine that the user intends to build a secure webmail application. The system 100 may consult its database of similar applications built by other users, and suggest to the user the individual images used in those projects or the package of images as a whole. The suggestion parameters 120 may change accordingly, e.g., instead of using the error rates 122 of the individual image, an application error rate of other users' secure webmail applications may be used instead.

The system 100 provides the one or more suggested container images 130 in a search result 128. In addition to the suggested container image 130, the search result 128 may also include any number (including zero) of other container images 116b, and the container images 116b may be a subset of the searched container images 116a. For example, in addition to the one or more suggested container images 130, the system 100 may also provide the top ten images with the highest composite suggestion score. The system 100 may present the images in a ranked order, and may flag or otherwise indicate potential issues with the one or more suggested container images 130 and the other container images 116b, so that a user may better appreciate why the system 100 suggested the one or more suggested container images 130 over the other container images 116b. In some examples, the search result 128 includes only the one or more suggested container images 130, and no non-suggested container images are provided in the search result. In other examples, the one or more suggested container images 130 and the other container images 116b are provided.

In some examples, the search result 128 is based on the search query 112 and the full set of suggestion parameters 120 used to generate the suggested container image 130. In other examples, the search result 128 may be based on the search query 112 and a subset of the suggestion parameters 120, for example the amount of cloud computational resources available to the user 118a, and the user SDE compatibility 126a.

Figure 2:
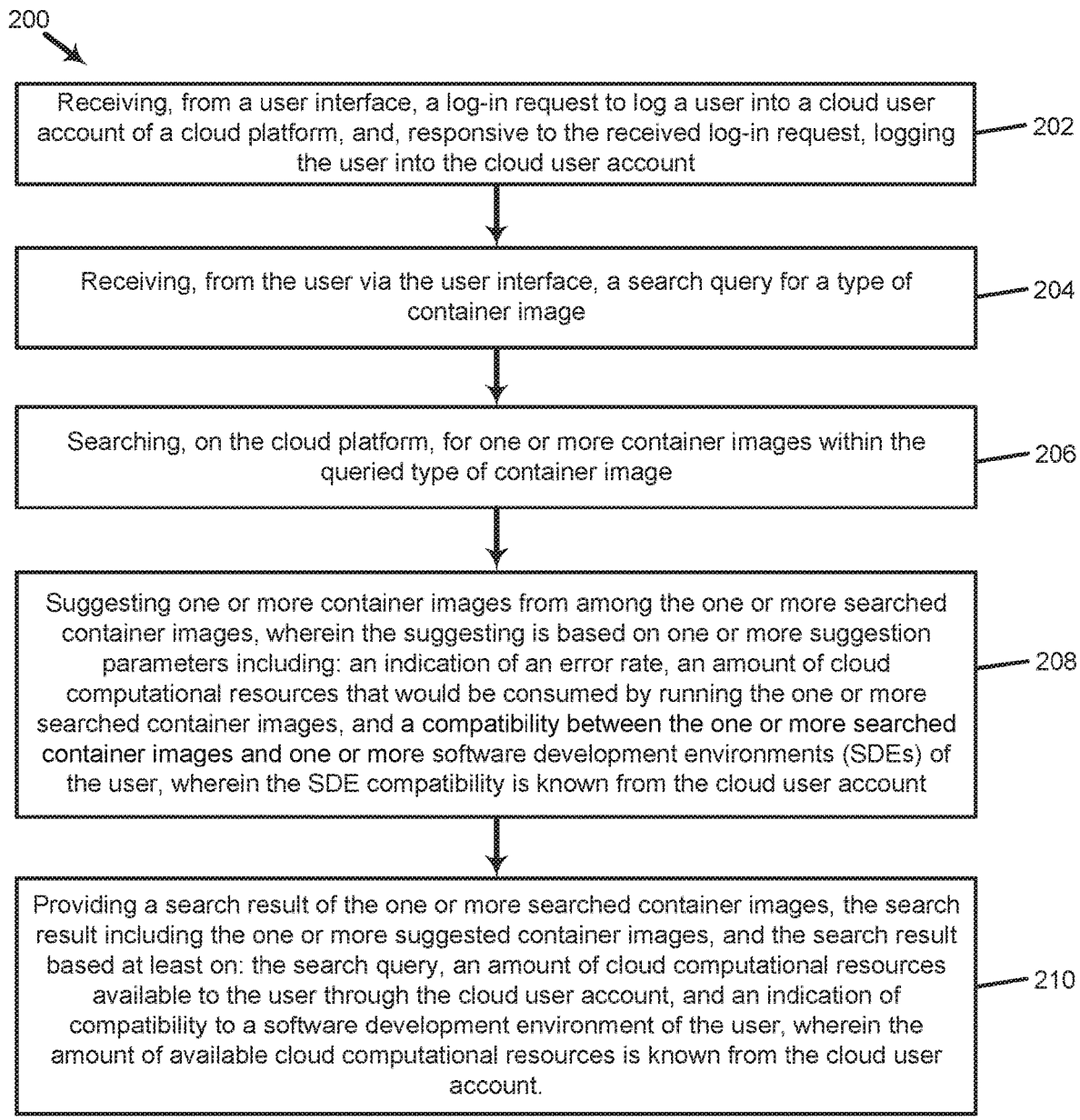
FIG. 2 is a flow diagram illustrating a method for suggesting at least one suggested container image from one or more container images, and including the suggested container image in a search result, in accordance with various examples of the present disclosure.

FIG. 2 is a flow diagram illustrating a method for suggesting at least one container image from one or more container images provided in a search result, in accordance with various examples of the present disclosure. The method 200 may be performed by non-transitory memory and processors. The non-transitory memory and processors may be provided, for example, by the system 100 described with respect to FIG. 1. Additional steps may be provided before, during, and after the steps of method 200, and some of the steps described may be replaced, eliminated and/or re-ordered for other examples of the method 200. For example, a user may be permitted to enter a search without logging in, but may be asked to log in to view the search result or to receive suggestions. In some examples, the search result may be provided before the suggested container images are generated. In other examples, the user's SDE compatibility may be received at the time of user log-in. Method 200 may be performed, for example, in combination with the steps of method 500 described with respect to FIG. 5. Method 200 may also be performed using the suggestion parameters 306, the search result 316, and other elements described with respect to FIG. 3. Additionally, method 200 may be performed using the amount of available cloud computational resources 418 and other elements with respect to FIG. 4. In some examples, method 200 may be performed by one or more systems, acting in concert or individually.

At action 202, a log-in request is received from the user interface to log a user into the user's cloud user account on a cloud platform. For example, the user may be an application developer attempting to log into the cloud platform. Responsive to the log-in request, the user is logged into the user's cloud user account.

The user interface may be, for example, a website, a web application, a smart phone application, etc. The user may enter his or her log-in credentials via an I/O component such as a keyboard or a touchscreen communicatively coupled to a computing device such as a personal computer or a smart phone. The user interface, e.g., website, may be communicatively coupled to the cloud platform via a network such as the internet, and the log-in request may be received by the system 100 described with respect to FIG. 1 and by the cloud platform via the internet.

At action 204, a search query is received for a type of container image. The search query may be general, for example, "web server," or specific, for example, a brand name web server. The user may enter the search query using an I/O component such as a keyboard, and the search query may be received using the same networks used for the log-in as described with respect to action 202. The user may search for any type, category, kind, class, etc., of container image, in effect, for any container image at all. For example, the user may search for web server images, web mail application images, operating system images, and so forth.

At action 206, the cloud platform is searched for container images within the type of queried container image, and if the image is not found on the cloud platform, the cloud platform may search for the image on external registries or image databases, including those hosted on other container image platforms, registries, or repositories. Thus, searching on the cloud platform includes searching registries external to the cloud platform as well (although the external searches may be transparent to the user).

At action 208, one or more container images are suggested from among the containers searched at action 206. The suggestion is based on one or more suggestion parameters, which may be static, such as a fixed rule to suggest the top ten images with the lowest error rates, or dynamic, such as when the suggestion parameters change in response to a change in the user's account type, or when the suggestion parameters change to focus on overall application parameters (such as security) in response to the system's determination that the user is piecing together an application (such as secure webmail) from disparate images. The suggestion parameters may include: an error rate of the image, an amount of computational resources that would be consumed by running the image, the user's SDE compatibility, the account type of the user, a composite score of one or more of the suggestion parameters, a privilege level of the user to run the image (e.g., root- or user-level), the popularity of the image (e.g., indicated by the number of times the image has been pulled), the features of the image (e.g., basic- or pro-level features), recommendations by other users, recommendations by the provider of the cloud platform, user reviews posted on external websites, community user ratings, etc.

At action 210, a search result is provided. The provided search result includes the one or more suggested images from action 208, and may additionally include one or more of the images searched at action 206. The search result is based at least on the search query, an amount of cloud computational resources available to the user through the user's cloud user account (which amount may be retrieved from the user's account and may vary depending on the type of account the user has), and the user's SDE compatibility (which compatibility may likewise be retrieved from the user's account). As described with respect to FIG. 1, the user's SDE compatibility may change dynamically, for example, as the user indicates or demonstrates additional SDE proficiencies.

Figure 3:
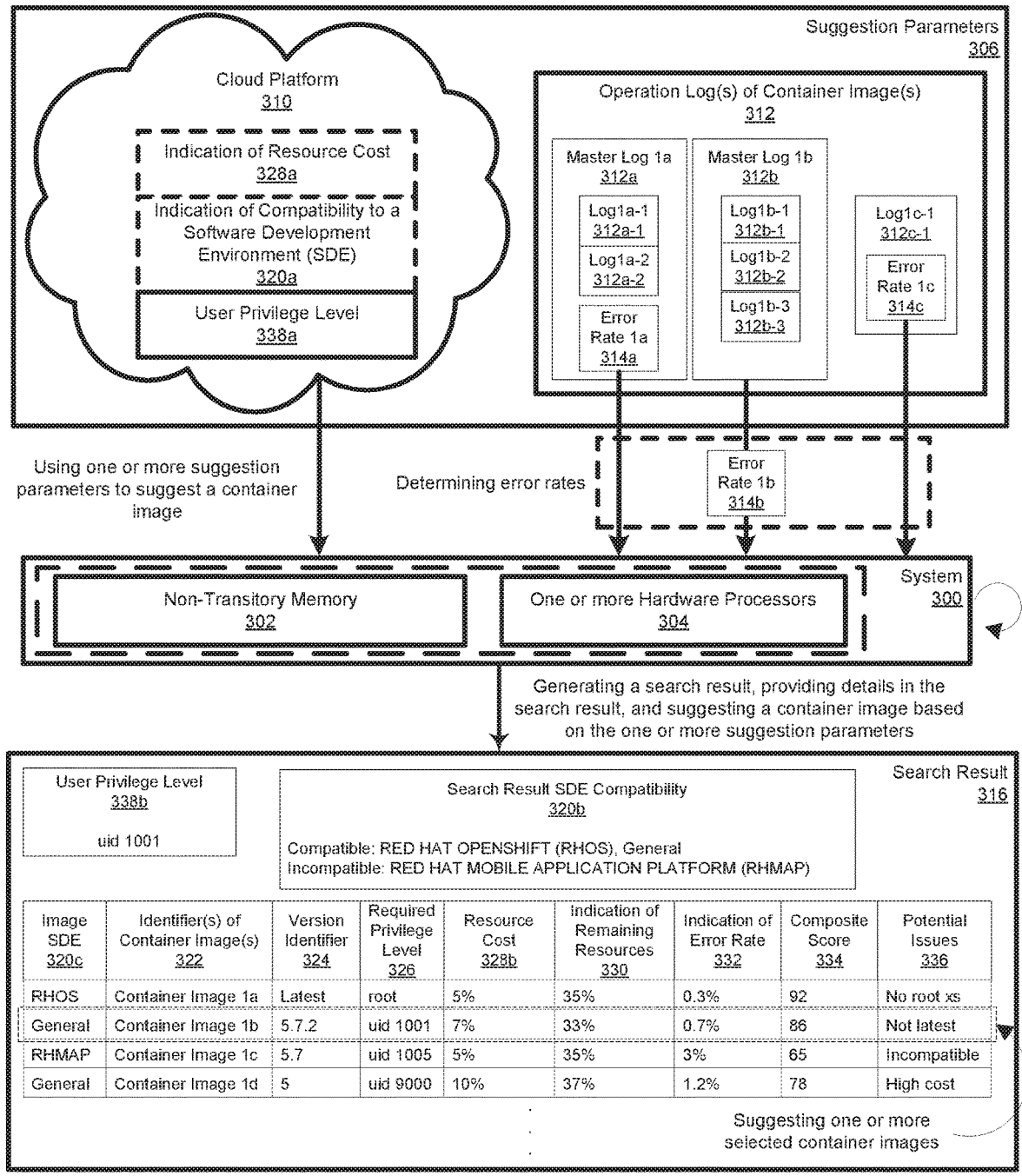
FIG. 3 is an organizational diagram illustrating a system including a non-transitory memory and one or more hardware processors for suggesting at least one container image from one or more container images, and including the suggested container image in a search result, where the suggesting includes determining an error rate of the one or more searched container images from one or more operation logs of the one or more searched container images, in accordance with various examples of the present disclosure.

FIG. 3 is an organizational diagram illustrating a system 300 including a non-transitory memory 302 and one or more hardware processors 304 for providing a search result 316. The system 300 suggests one or more container images using one or more suggestion parameters 306. The suggestion parameters 306 include an error rate, e.g., 314a, 314b, 314c, of the one or more searched container images. The error rate may be determined from one or more operation logs 312 corresponding to the one or more searched container images. The suggested container images are chosen from among the one or more searched container images, and the system 300 provides the one or more suggested container images in the search result 316 in accordance with various examples of the present disclosure.

For example, the suggestion parameters 306 may include an indication of a resource cost 328a and an indication of a user's compatibility to a software development environment (user's SDE compatibility) 320a. The indication of the resource cost 328a may be an amount of cloud computational resources that would be consumed by running the image. In addition, other suggestion parameters 306 may be included, such as a user privilege level 338a. The user's SDE compatibility 320a may indicate the SDEs that a user is familiar with or that the user's computer system is able to handle. The suggestion parameters 306 such as the indication of the resource cost 328a, the user's SDE compatibility 320a and the user privilege level 338a may be retrievable from the user's account on a cloud platform 310.

The system may also make suggestions based on the suggestion parameters 306 not retrievable, or not retrieved, from the cloud platform 310. For example, the error rate 314a, 314b, 314c, and so forth, may be derived from the operation logs 312 of the one or more container images. The operation logs 312 may capture the operational details of a running container image, including failures, errors, exceptions, run time, build time, resource consumption, etc.

The operation logs 312 may comprise of image-specific operation logs, and there may be multiple image-specific operation logs per container image. For example, as illustrated in FIG. 3, Container Image 1a has two logs, log 1a-1 (as indicated by 312a-1 in FIG. 3), and log 1a-2 (indicated by 312a-2). However, the multiple image-specific operation logs may be aggregated into a master operation log. For example, in FIG. 3, log 1a-1 and log 1a-2 are aggregated into a master operation log, Master Log 1a (indicated by 312a). An error rate may be included in the master log, as illustrated by Error Rate 1a (indicated by 314a). Here, the Error Rate 1a (indicated by 314a) indicates the overall error rate for the Container Image 1a.

In some examples without a master log, the error rate may be included in the image-specific logs. For example, this may be illustrated by Error Rate 1c (indicated by 314c), which is included in Log 1c-1 (indicated by 312c-1). The Error Rate 1c (indicated by 314c) indicates the error rate for Container Image 1c, since in this particular example there are no other image-specific logs for Container Image 1c. However, if there were other such image-specific logs, the overall error rate for Container Image 1c may be obtained by performing mathematical operations (such as summing, averaging, taking the median, etc.) on the error rates in the image-specific logs.

In some examples, the error rate may not be included in either a master log or an individual log. Yet, the system 300 may still calculate or derive the error rate from reading or parsing either the master log or the individual logs. For example, as illustrated in FIG. 3, neither Master Log 1b, nor the image-specific logs Log 1b1-, Log 1b-2, or Log 1b-3, include an explicit error rate. However, the system 300 may read or parse each of these logs to determine an error rate, Error Rate 1b (indicated by 314b), for the Container Image 1b. For example, the system 300 may read the operation logs for event flags, error codes, exceptions, system crashes, server crashes, unexpected interruptions, and other information to determine a number of errors that have occurred. The system 300 may obtain an error rate by, for example, averaging the number of errors over the operation logging period (e.g., every twenty-four hours for starter accounts or every one-week for professional accounts).

The system 300 generates a search result 316 and provides details such as: the user privilege level 338b, an indication of the user's SDE compatibility 320b, an SDE 320c of the one or more searched container images, one or more identifiers of one or more searched container images 322, a version identifier 324 corresponding to the one or more searched container images, a required privilege level 326 to run the one or more searched container images, a resource cost 328b that would be consumed by running the one or more searched container images, an indication of remaining resources 330 after running the one or more searched container images, an indication of the error rate 332 determined from the operation logs 312, a composite score 334 of the suggestion parameters used by the system 300 to generate the one or more suggested container images, and an indication of potential issues 336 from running the one or more searched container images. While particular details of the search result 316 are identified in the above examples, other details may be included in the search result 316 and the details described herein are not limited to these examples.

The user privilege level 338b may be the retrieved form of the user privilege level 338a on the cloud platform 110, however the user privilege level 338b may contain more detailed information than the user privilege level 338a. In some examples, while user privilege level 338a may only indicate a user's access class such as root, special administrative, non-privileged, etc., user privilege level 338b may additionally show the uid level of the user to facilitate at a glance comparisons of the user's own privilege level 338b with the required privilege level 326 of the one or more searched container images in the search result 316. In other examples, the information contained in privilege level 338b is the same as 338a.

Similarly, the system 300 may retrieve the user's SDE compatibility 320a from the user's account on the cloud platform 110. The system 300 may compare the user's SDE compatibility 320a with the image SDE 320c of the one or more searched container images, and provide a search result SDE compatibility 320*b*. The search result SDE compatibility 320*b* may contain more detailed information than the user's SDE compatibility 320*a*, and the information shown in the search result SDE compatibility 320*b* may be context-dependent. For example, while the user's SDE compatibility 320*a* may be in the form of a comprehensive checklist, such as one indicating the user's compatibility to an exhaustive list of SDEs supported on the cloud platform, the search result SDE compatibility 320*b* may be more particular and home in on the user's specific compatibility to the image SDEs 320*c* of the one or more searched container images provided in the search result 316. Further, the search result SDE compatibility 320*b* may be more descriptive than the user's SDE compatibility 320*a*. For example, as shown in FIG. 3, the set of SDEs 320*c* of the one or more searched container images include RHOS, General, and RHMAP. Therefore, in this particular example, the search result SDE compatibility 320*b* only indicates the user's compatibility with RHOS, General and RHMAP.

The one or more identifiers of the container images 322 may be a name, an identification number, a hash, or any other identifier of the one or more searched container images. The version identifier 324 describes the version of the container image, and may contain letters (e.g., latest) as well as numbers (e.g., 5.7). The required privilege level 326 indicates an amount of privileges required to run the image. For example, some images may need to be run as a root user, while other images may allow particular types of users to run them. Root users have full administrative access to the operating system, and are conventionally assigned a userid (uid) of 0. Special system users or pseudo users, such as daemons and operators which require some administrative powers, may be assigned uids in a higher range, for example 1-99. Non-privileged users may be assigned uids beginning from, for example, 500, or 1000. Uids may be unique, may identify users, and may be associated with other user information such as passwords.

The resource cost 328*b* indicates an amount of cloud computational resources that would be consumed by running the image, while the indication of remaining resources 330 indicates an amount of cloud computational resources that would remain available to the user after the image is run. For example, the resource cost of running Container Image 1*a* is 5%, and 35% of the user's cloud computational resources would remain after running Container Image 1*a*.

The indication of error rate 332 provides a number, fraction, percentage, icon, symbol, or other representation of the error rate, which may be determined from the operation logs 312 as described above. For example, the error rate of Container Image 1*a* is indicated as 0.3%.

The composite score 334 provides a score of one or more of the suggestion parameters used in the suggesting of the one or more searched container images. The score may be a weighted score, and each parameter may be assigned a different weight from another. In addition, the weighting may change from one user to another, and may depend on information available to the cloud platform such as the user account type, the image search trajectory, indicated user preferences, indicated use cases, etc. For example, the composite score of Container Image 1*a* is 92.

The system 300 also indicates potential issues with the one or more searched container images in the search result 316. For example, even though Container Image 1*a* has the lowest indicated error rate of 0.3% and the highest composite score of ninety-two points, Container Image 1*a* has not been suggested by the system 300 because the user does not have sufficient access privileges to run the image. As illustrated in FIG. 3, the required privilege level to run Container Image 1*a* is root access, which the user does not have. In the example user privilege level 338*b* provided in the search result 316, the user has uid of 1001 (and not root or uid 0). Accordingly, the system indicates by text commentary in potential issues 336 that the user has "no root xs" (no root access).

Even though the system 300 may not be able to suggest the highest scored image, the system 300 may still be able to suggest an alternative, if the alternative is indeed one worthy of recommendation. In FIG. 3, the best alternative is Container Image 1*b*, since there are no privilege access issues and it has the second-highest composite score of eighty-six points. In some examples, a hard cut-off score may be enforced such that alternatives below the cut-off will not be recommended. Thus in some examples, the system 300 may not suggest any of the one or more searched container images, because all of the images may be below the cut-off.

FIG. 4 is an organizational diagram illustrating an amount of available cloud computation resources, in accordance with various examples of the present disclosure. The elements in the amount of available cloud computational resources in FIG. 4 may be provided, for example, in combination with elements described with respect to FIG. 1 (e.g., an amount of computational resources available to a user 118*a*), in combination with the steps of method 200 described with respect to FIG. 2 (e.g., action 208), in combination with elements described with respect to FIG. 3 (e.g., an indication of remaining resources 330), in combination with the steps of method 500 described with respect to FIG. 5 (e.g., action 516), etc., in accordance with various examples of the present disclosure.

The amount of available cloud computational resources 418 may provide a resource identifier 422, a description 424 of the resource identifier, an indication of a number of available virtual CPUs 426, an indication of available memory 428, an indication of available storage 430, an indication of when the cloud computational resources would be next available (when next available) 432, an indication of scheduled jobs 434, and an indication of when the operation logs were last aggregated into a master log (last aggregated log) 436. In some examples, the indications 426-434 show current values; in other examples, the indications 426-434 show both current and historic values; in further examples, the indications 426-434 show historic values.

The resource identifier 422 provides identifying information about the hardware or virtual resources made available or assigned to the user. The identifier may be a name, an identification number, a hash tag, or any other identifier. For example, the identifier may be "Starter Plan VM1 or Pro Plan VM4," which is indicative of the type of user account (starter or pro), the type of resource (virtual machine) and the serial number of the virtual resource (VM1).

The description 424 provides further information about the resource identified in resource identifier 422. For example, the description may include the location of the computer hardware (e.g., a server cluster) hosting the identified resource. The resource may be physical computer hardware including a CPU and a memory, a virtual machine, a virtualized operating system (if virtualized at the operating system level), or other kinds of resources for cloud computing. As illustrated in FIG. 4, the description 424 provides that Starter Plan VM1 is located in the North Virginia Cluster.

The available virtual CPUs 426 provides information about an amount of virtual CPUs (vCPUs) that the identified resource has available to the user to perform cloud computational processes on the cloud platform. The amount of vCPUs may depend on the type of user account, may be a fixed amount, and may scale on demand. For example, starter account users may have less available vCPUs 426 than professional or enterprise account users. As illustrated in FIG. 4, the available virtual CPUs 426 indicates that Starter Plan VM1 has 1 available vCPU, while Pro Plan VM1 has 93 available vCPUs.

The indication of the available memory 428 provides information about an amount of memory that the identified resource has available for the user to perform cloud computational processes on the cloud platform. The amount of available memory may depend on the type of user account, may be a fixed amount, and may scale on demand. For example, starter account users may have a lower memory 428 limit than professional or enterprise account users. As illustrated in FIG. 4, the available memory 428 indicates that Starter Plan VM1 has 557 megabytes (MiB) of available memory, while Pro Plan VM1 has 1828 MiB available.

The indication of the available storage 430 provides information about an amount of storage capacity that the identified resource has available for the user to run cloud computational processes on the cloud platform. The storage may be persistent or non-persistent, and may be a fixed amount or scalable. Starter account users may have a lower storage capacity limit than professional or enterprise account users. As illustrated in FIG. 4, Starter Plan VM1 has 728 MiB of available storage, while Pro Plan VM1 has 83 gigabytes (GiB) of available storage.

The indication of when the cloud computational resources would be next available (when next available) 432 provides information about when the cloud computational resources would be next available to the user. The indication of when next available 432 becomes particularly important if the cloud platform enforces a resource hibernation policy. For example, the resources may be forced to sleep periodically, such as every eighteen hours per seventy-two hours. The resource hibernation policy may depend on the type of user account. For example, the hibernation policy may only apply to starter accounts, and in some examples, professional accounts may have an always-on policy such that the resources may never enter hibernation.

The indication of scheduled jobs 434 provides information about upcoming cloud computational processing jobs. This helps the user to, for example, plan usage of the cloud computational resources to avoid peak periods. The user may also use the indication of scheduled jobs 434 to verify that the resources are performing the correct tasks in the correct sequence.

The indication of when the operation logs were last aggregated into a master log (last aggregated log) 436 provides information about the logging frequency and the logging data collection period. For example, the last aggregated log 436 may show a one-day range for starter accounts, indicating that operation data are aggregated into master logs every twenty-four hours. By contrast, the last aggregated log 436 may show a one-week range for professional accounts. A shorter period of analysis may yield more instability in the suggested image, as temporary, short-lived errors may cause an otherwise well-performing image to temporarily not be suggested, only to return as a top suggestion shortly thereafter.

Figure 5:
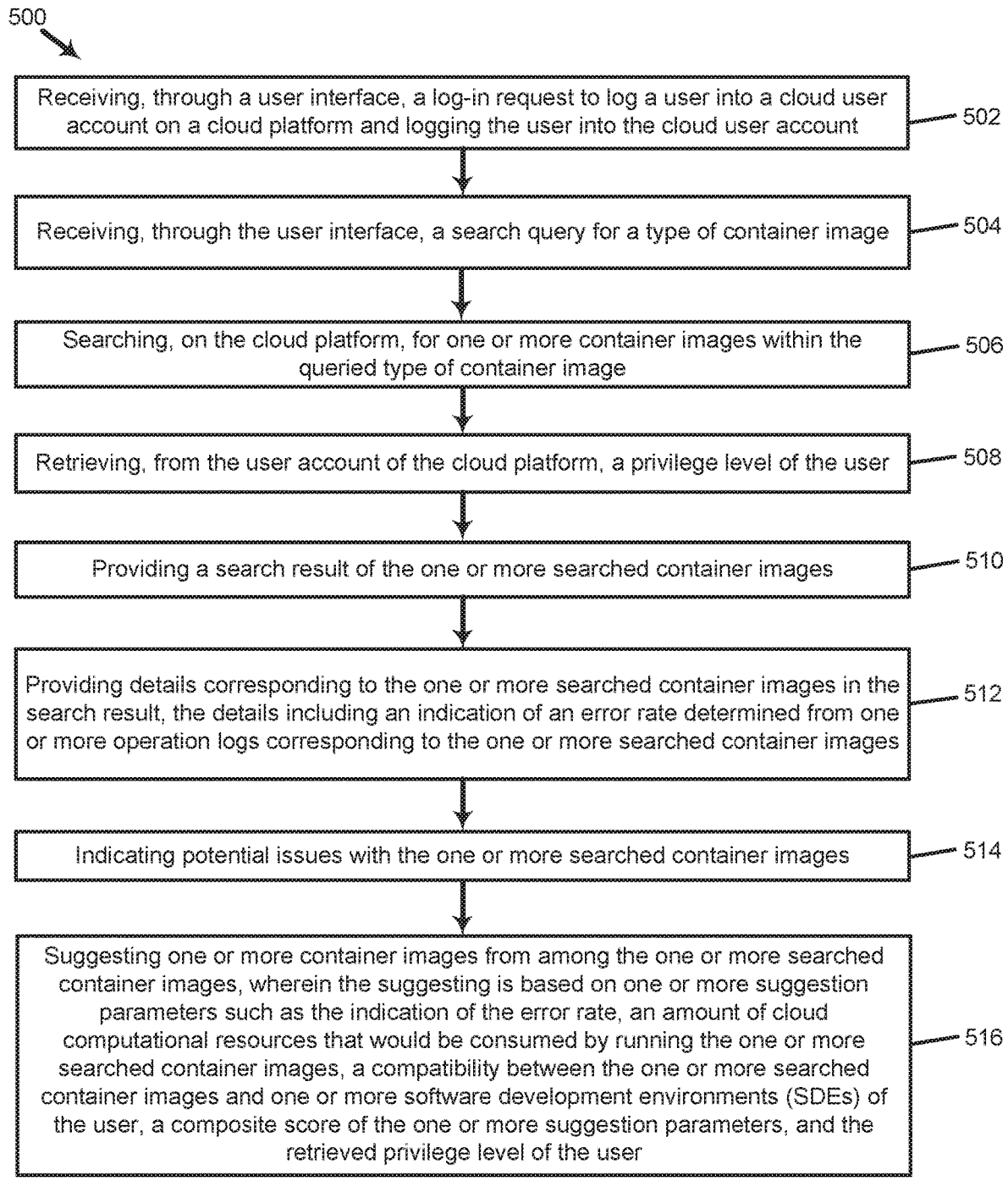
FIG. 5 is a flow diagram illustrating a method for suggesting at least one container image from one or more container images, and including the suggested container image in a search result, in accordance with various examples of the present disclosure.

FIG. 5 is a flow diagram illustrating a method 500 for suggesting at least one container image from one or more container images, and including the suggested container image in a search result. The method 500 also includes: retrieving a privilege level of a logged-in user from the logged-in user's account; providing details in a search result, such as an error rate corresponding to the one or more searched container images, the error rate determined from one or more operation logs corresponding to the one or more searched container images; and indicating potential issues of the one or more searched container images, in accordance with various examples of the present disclosure.

The method 500 may be performed by non-transitory memory and processors. The non-transitory memory and processors may be provided, for example, by the system 100 described with respect to FIG. 1. Additional steps may be provided before, during, and after the steps of method 500, and some of the steps described may be replaced, eliminated and/or re-ordered for other examples of the method 500. For example, the privilege level of the user may be retrieved upon log-in rather than after the user has entered a search query. In some examples, the potential issues with the one or more searched container images may be indicated at the same time that the search result is provided. Method 500 may be performed, for example, in combination with the steps of method 200 described with respect to FIG. 2. Method 500 may also be performed using the suggestion parameters 306, the search result 316, and other elements described with respect to FIG. 3. Additionally, method 500 may be performed using the amount of available cloud computational resources 418 and other elements described with respect to FIG. 4. In some examples, method 500 may be performed by one or more systems, acting in concert or individually.

At action 502, a log-in request to log a user into the user's cloud user account on a cloud platform is received through a user interface. The user interface may be a command line interface or a graphical user interface, and may be in the form of a website, a desktop or laptop application, a tablet application, a mobile phone application, a user portal, or any other form of user interface which a user may use to log into a cloud platform. Responsive to the log-in request (accompanied by the correct log-in credentials), the user is logged into the user's cloud user account.

At action 504, a search query for a type of container image is received through the user interface. Any type of container image may be searched for, and the search query may be in any form. For example, a user may search generally for "web server," or particularly for a brand name web server.

At action 506, the cloud platform is searched for one or more container images within the queried type of container image. For example, if the queried type of container image is a "web server," then the cloud platform may be searched for container images of web servers. If the search query was for a particular brand name, then the cloud platform may be searched for container images including that particular brand name. The system may determine that the particular brand name relates to a particular type of image, such as web servers, and extend the search to brand named web servers bearing that particular brand. Further, the cloud platform may find multiple versions of the container image with the same brand name. For example, a first container image may be "brand name container image version 3.0," while a second container image may be "brand name container image version 3.1."

At action 508, a privilege level of the user is retrieved from the user account of the cloud platform. The user's privilege level may be obtained in various ways, for example, from the user's initial registration of the user's account, from asking the user to provide a privilege level in the user account, from uid fields of existing related projects on the cloud platform (which may subsequently update the user's privilege level in the user's account), etc.

At action 510, a search result of the one or more searched container images is provided.

At action 512, details corresponding to the one or more searched container images is provided in the search result. The details include an indication of an error rate determined from one or more operation logs corresponding to the one or more searched container images, and may also include information corresponding to the one or more searched container images, such as the images' SDE, image identifier, version identifier, required privilege level, resource cost, and composite score. The search result may also indicate an amount of resources that would remain by running the image.

At action 514, potential issues with the one or more searched container images are indicated. The potential issues may be indicated on the provided search result, or may be indicated in a separate notification, such as a pop-up, a push notification, a text alert, an email alert, a flag, a light, a sound, a voice, or any other form of notification. The potential issue may be described in plain text, by an issue code, a color code, etc.

At action 516, one or more container images are suggested from among the one or more container images searched at action 506. The suggesting is based on one or more suggestion parameters, such as the indication of the error rate, the resource cost (or an amount of cloud computational resources that would be consumed by running the one or more searched container images), a compatibility between the one or more searched container images and one or more software development environments of the user, a composite score of the one or more suggestion parameters, and the retrieved privilege level of the user.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A system comprising:
   a non-transitory memory; and
   one or more hardware processors coupled to the non-transitory memory to execute instructions from the non-transitory memory to perform operations comprising:
      receiving, from a user interface, a log-in request to log a user into a cloud user account of a cloud platform, and, responsive to the log-in request, logging the user into the cloud user account;
      receiving, from the user via the user interface, a search query for a type of container image that includes data for executing a container;
      searching, on the cloud platform, for one or more container images corresponding to the queried type of container image;
      suggesting one or more container images from among the one or more searched container images, wherein the suggesting is based on the search query received from the user and one or more suggestion parameters including: an error rate of executing the one or more searched container images, an amount of cloud computational resources that would be consumed by running the one or more searched container images, and a compatibility between the one or more searched container images and one or more software development environments (SDEs) of the user, wherein the SDE compatibility is known from the cloud user account; and
      providing a search result of the one or more searched container images, the search result including the one or more suggested container images, and the search result based at least on: the search query, an amount of cloud computational resources available to the user through the cloud user account, and the SDE compatibility, wherein the amount of available cloud computational resources is known from the cloud user account.

2. The system of claim 1, further comprising providing, in the search result, details corresponding to the one or more searched container images including: one or more identifiers of the one or more searched container images, a version identifier of the one or more searched container images, a privilege level required to run the one or more searched container images, an indication of a cloud computational resource cost of the one or more searched container images, an indication of an amount of cloud computational resources that would remain after running the one or more searched container image, and the error rate of the one or more searched container images.

3. The system of claim 1, wherein the suggesting is further based on a composite score of the one or more suggestion parameters.

4. The system of claim 1, further comprising indicating potential issues with the one or more searched container images.

5. The system of claim 1, wherein the error rate is determined from one or more operation logs corresponding to the one or more container images.

6. The system of claim 5, wherein the one or more operation logs is aggregated into a master operation log.

7. A computer-implemented method comprising:
   receiving, from a user interface, a log-in request to log a user into a cloud user account of a cloud platform, and, responsive to the log-in request, logging the user into the cloud user account;
   receiving, from the user via the user interface, a search query for a type of container image that includes data for executing a container;
   searching, on the cloud platform, for one or more container images corresponding to the queried type of container image;
   suggesting one or more container images from among the one or more searched container images, wherein the suggesting is based on the search query received from the user and one or more suggestion parameters including: an error rate of executing the one or more searched container images, an amount of cloud computational resources that would be consumed by running the one or more searched container images, and a compatibility between the one or more searched container images and one or more software development environments (SDEs) of the user, wherein the SDE compatibility is known from the cloud user account; and providing a search result of the one or more searched container images, the search result including the one or more suggested container images, and the search result based at least on: the search query, an amount of cloud computational resources available to the user through the cloud user account, and the SDE compatibility, wherein the amount of available cloud computational resources is known from the cloud user account.

8. The method of claim 7, further comprising providing, in the search result, details corresponding to the one or more searched container images including: one or more identifiers of the one or more searched container images, a version identifier of the one or more searched container images, a privilege level required to run the one or more searched container images, an indication of a cloud computational resource cost of the one or more searched container images, an indication of an amount of cloud computational resources that would remain after running the one or more searched container image, and the error rate of the one or more searched container images.

9. The method of claim 7, wherein the suggesting is further based on a composite score of the one or more suggestion parameters.

10. The method of claim 7, further comprising indicating potential issues with the one or more searched container images.

11. The method of claim 7, further comprising retrieving a privilege level of the user from the cloud user account and including the privilege level of the user in the one or more suggestion parameters.

12. The method of claim 7, wherein the amount of available cloud computational resources available to the user includes at least an indication of an amount of memory available to the user, an indication of an amount of storage available to the user, an indication of when the available cloud computational resources would be available to the user, and an indication of scheduled jobs.

13. The method of claim 7, wherein the error rate is determined from one or more operation logs corresponding to the one or more container images.

14. The method of claim 13, wherein the one or more operation logs is aggregated into a master operation log.

15. A non-transitory machine-readable medium having stored thereon machine-readable instructions executable to cause at least one machine to perform operations comprising:

receiving, from a user interface, a log-in request to log a user into a cloud user account of a cloud platform, and, responsive to the log-in request, logging the user into the cloud user account;

receiving, from the user via the user interface, a search query for a type of container image that includes data for executing a container;

searching, on the cloud platform, for one or more container images corresponding to the queried type of container image;

suggesting one or more container images from among the one or more searched container images, wherein the suggesting is based on the search query received from the user and one or more suggestion parameters including: an error rate of executing the one or more searched container images, an amount of cloud computational resources that would be consumed by running the one or more searched container images, and a compatibility between the one or more searched container images and one or more software development environments (SDEs) of the user, wherein the SDE compatibility is known from the cloud user account; and providing a search result of the one or more searched container images, the search result including the one or more suggested container images, and the search result based at least on: the search query, an amount of cloud computational resources available to the user through the cloud user account, and the SDE compatibility, wherein the amount of available cloud computational resources is known from the cloud user account.

16. The non-transitory machine-readable medium of claim 15, further comprising providing, in the search result, details corresponding to the one or more searched container images including: one or more identifiers of the one or more searched container images, a version identifier of the one or more searched container images, a privilege level required to run the one or more searched container images, an indication of a cloud computational resource cost of the one or more searched container images, an indication of an amount of cloud computational resources that would remain after running the one or more searched container image, and the error rate of the one or more searched container images.

17. The non-transitory machine-readable medium of claim 15, wherein the suggesting is further based on a composite score of the one or more suggestion parameters.

18. The non-transitory machine-readable medium of claim 15, further comprising indicating potential issues with the one or more searched container images.

19. The non-transitory machine-readable medium of claim 15, wherein the error rate is determined from one or more operation logs corresponding to the one or more container images.

20. The non-transitory machine-readable medium of claim 15, wherein the one or more operation logs is aggregated into a master operation log.

* * * * *